United States Patent [19]
Coux et al.

[11] Patent Number: 5,310,266
[45] Date of Patent: May 10, 1994

[54] ROLLING-CONTACT BEARING ASSEMBLY WITH DATA SENSOR

[75] Inventors: Isabelle Coux, Seynod; Claude Sonnerat, Annecy Le Vieux; Roger Dumas, La Balme de Sillingy; Roger Chalansonnet, Annecy, all of France

[73] Assignee: The Torrington Company, Torrington, Conn.

[21] Appl. No.: 65,717

[22] Filed: May 21, 1993

[30]  Foreign Application Priority Data

Feb. 5, 1993 [FR] France ................................ 93 01283

[51] Int. Cl.⁵ .......................... F16C 33/78; G01P 3/44
[52] U.S. Cl. .................... 384/448; 324/207.25
[58] Field of Search .................. 384/448; 324/207.25; 310/168; 73/118.1

[56]  References Cited

U.S. PATENT DOCUMENTS

| | | | |
|---|---|---|---|
| 5,011,303 | 4/1991 | Caron | 384/448 |
| 5,097,701 | 3/1992 | Nantua et al. | 73/118.1 |
| 5,195,382 | 3/1993 | Peilloud | 324/207.25 X |
| 5,195,830 | 3/1993 | Caillault et al. | 384/448 |

*Primary Examiner*—Thomas R. Hannon
*Attorney, Agent, or Firm*—John C. Bigler

[57]  ABSTRACT

A packing is mounted on a fixed ring of a rolling-contact bearing with rolling elements in contact with the fixed ring and a rotating ring. A sensor is supported by the packing and an encoder is mounted on the rotating ring. A protective casing for the sensor and its connection with a feed cable has a chamber extending axially, between a recess receiving the fixed ring and a bottom wall of the casing, for holding the cable. The resulting rolling-contact bearing assembly may include a winding cylinder and may include features permitting assembling together of a number of casings for different bearing assemblies.

11 Claims, 4 Drawing Sheets

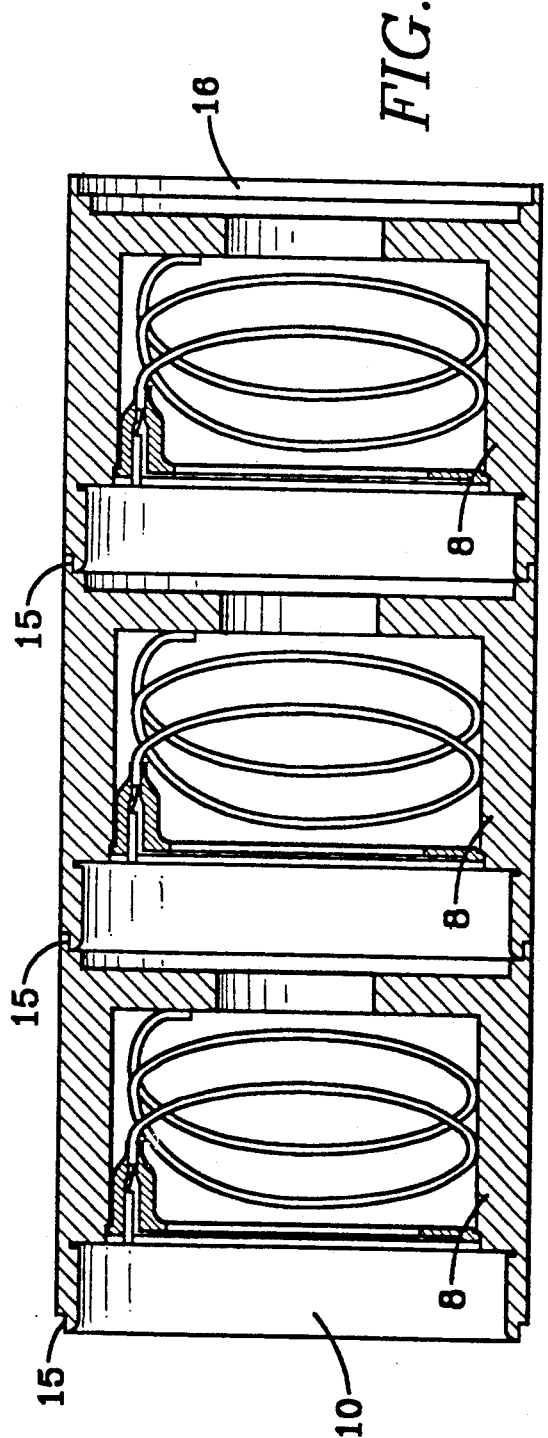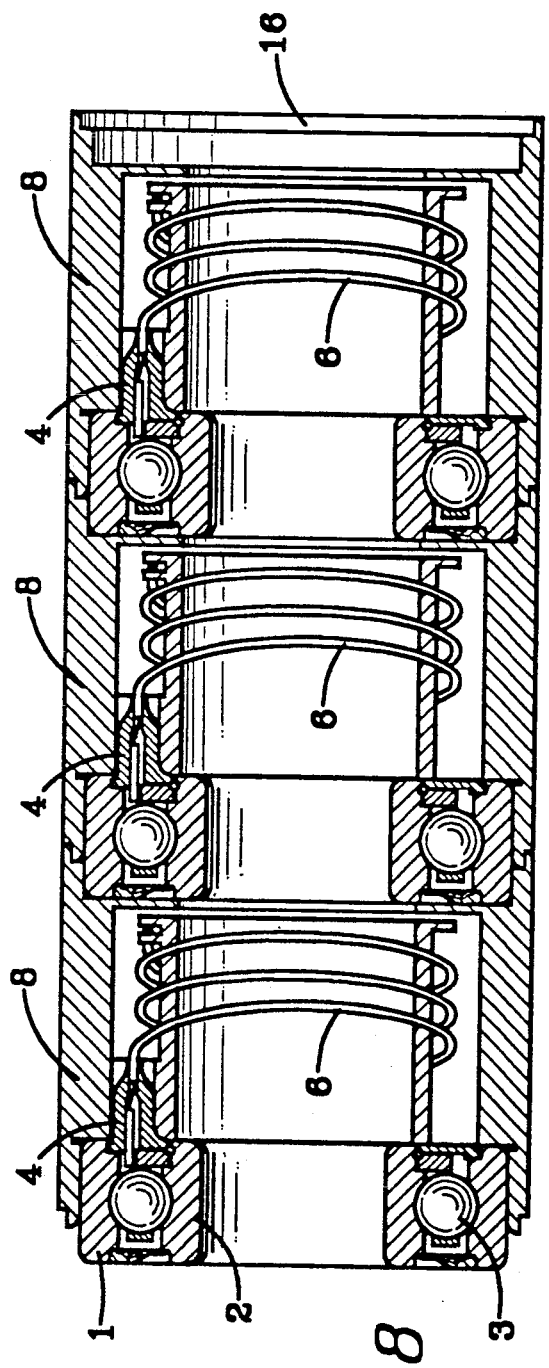

ROLLING-CONTACT BEARING ASSEMBLY WITH DATA SENSOR

BACKGROUND OF THE INVENTION

This invention relates generally to a rolling-contact bearing assembly with a data sensor and, more particularly, to a bearing assembly which has a protective casing for a sensor component.

French Patent No. 2,661,246 A describes a rolling-contact bearing assembly with a data sensor which has a closed casing intended to protect the sensor means and the feed cable which is an integral part of the latter. However, this casing does not provide protection for the cable, particularly during the course of mounting on the rolling-contact bearing.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a rolling-contact bearing assembly comprising a fixed ring, a rotating ring, rolling elements in contact with said rings, a packing mounted on the fixed ring, sensor means supported by said packing, encoding means mounted on the rotating ring, and a protective casing for the sensor means and its connection with a feed cable. The casing has a chamber, extending axially between a recess for receiving the fixed ring and a bottom wall of the casing, for holding the cable.

The foregoing and other aspects will become apparent from the following detailed description of the invention when considered in conjunction with the accompanying drawing figures.

BRIEF DESCRIPTION OF THE DRAWING FIGURES

FIG. 7 is an axial cross-sectional view of an assembled group of protective casings of the rolling-contact bearing assembly of FIG. 1, which support inserted packings; and FIG. 8 is an axial cross-sectional view of an assembled group of rolling-contact bearing assemblies of FIG. 6 with data sensors.

Figure 1:
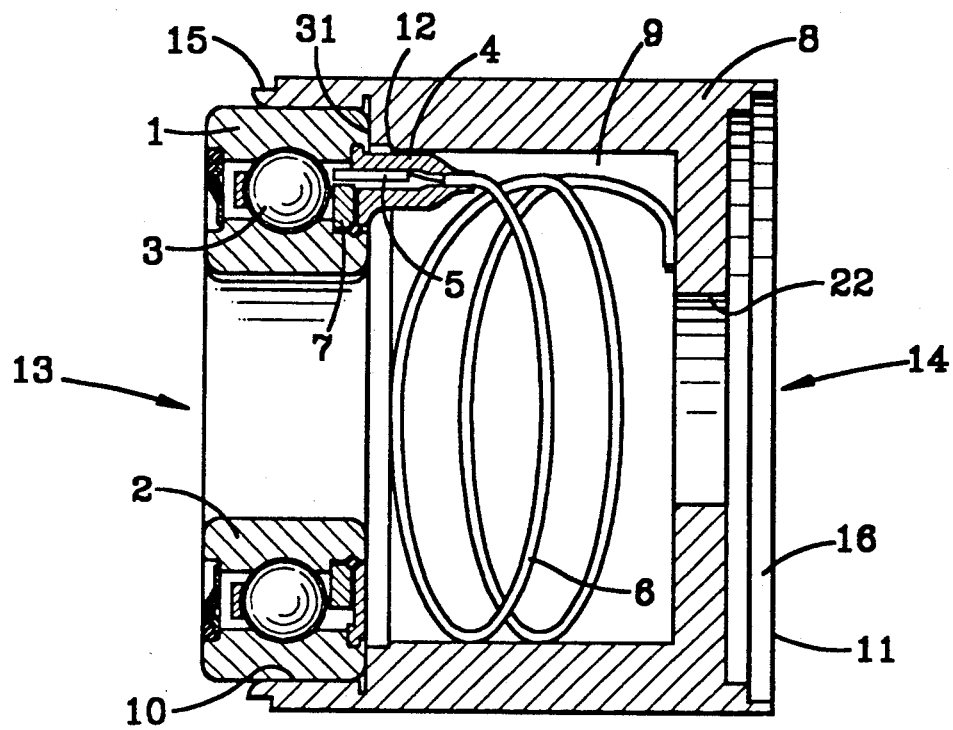
FIG. 1 is an axial cross-sectional view illustrating the rolling-contact bearing assembly with data sensor of the present invention.
Figure 2:
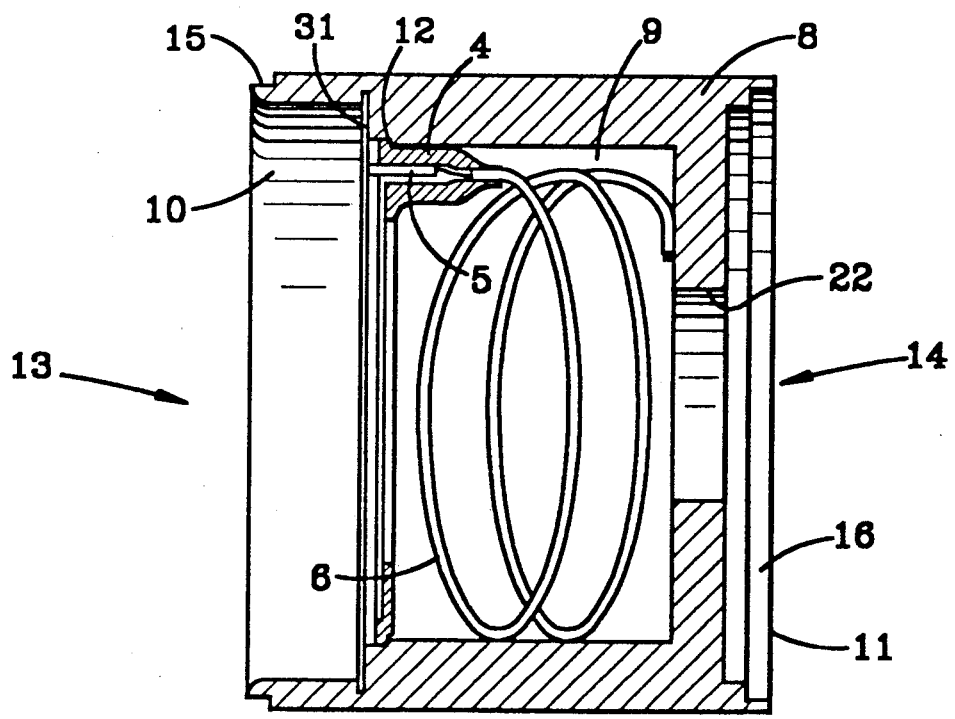
FIG. 2 is an axial cross-sectional view illustrating the protective casing of the rolling-contact bearing assembly of FIG. 1, which supports a packing.

Parts which are similar in FIGS. 1 through 8 are identified by the same reference numerals.

DETAILED DESCRIPTION

Referring now to the drawings, FIG. 1 illustrates a rolling-contact bearing assembly with a data sensor, similar to that described in French Patent No. 2,668,561 A, having a fixed ring 1, a rotating ring 2, and rolling elements 3 in contact with said rings 1 and 2.

Fixed ring 1 supports a packing 4 on which are mounted a sensor means 5 and a feed cable 6 of sensor means 5 including a boss of packing 4. Rotating ring 2 supports an encoding means 7. A protective casing 8 for sensor means 5 and its connection with feed cable 6 is mounted on fixed ring 1. Casing 8 has a chamber 9, which extends axially between a recess 10 for receiving fixed ring 1 and bottom wall 11 of casing 8, for holding feed cable 6.

Figure 3:
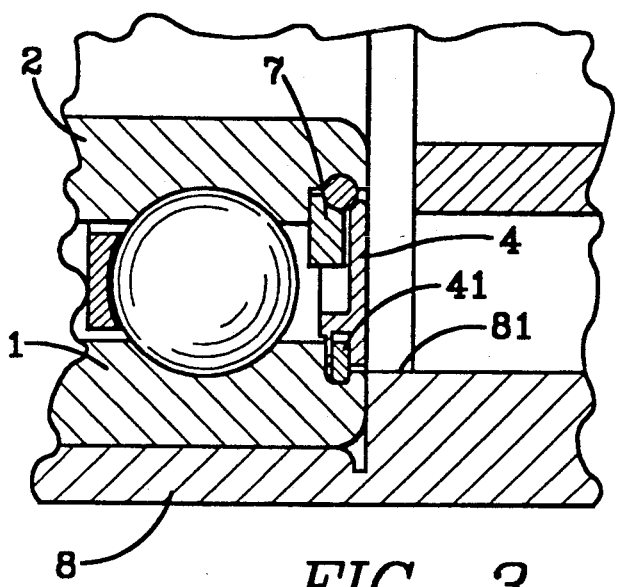
FIG. 3 is an enlarged cross-sectional view of a portion of the rolling-contact bearing assembly of FIG. 1 showing the holding of the packing in the protective casing after mounting of the packing on the rolling-contact bearing.
Figure 4:
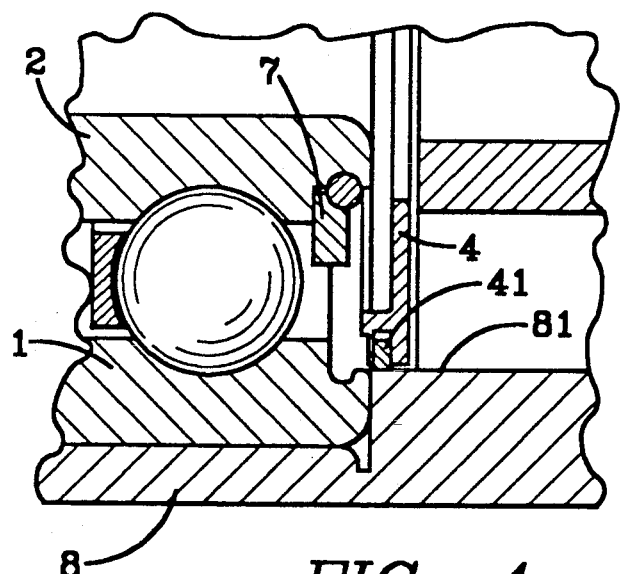
FIG. 4 is an enlarged cross-sectional view of the rolling-contact bearing assembly of FIG. 1 showing the positioning of the packing in the protective casing before mounting of the packing on the rolling-contact bearing.

According to FIGS. 3 and 4, casing 8 has a bearing surface 81 for receiving an expansible retainer segment 41 of packing 4, limited by an axial abutment shoulder 12 located in chamber 9 for immobilizing packing 4 by compression of retainer segment 41 in a holding position before it is mounted in fixed ring 1. This type of construction provides protection for packing 4, sensor means 5 and feed cable 6, before assembly of the rolling-contact bearing on casing 8.

Casing 8 has at its extremities 13 and 14 assembly zones 15 and 16, respectively. Assembly zone 15 consists of an exterior cylindrical bearing surface adjacent the rolling-contact bearing, and assembly zone 16 consists of a counterbore located opposite the rolling-contact bearing. As shown in FIG. 7, assembly zone 16 can receive assembly zone 15 of another casing to permit the assembly of a number of casings which support packing 4 and feed cable 6 before the casings are mounted on fixed ring 1.

Assembly zones 15 and 16 also permit, as shown in FIG. 8, the assembly of a number of casings which support a rolling-contact bearing and data sensor.

Figure 5:
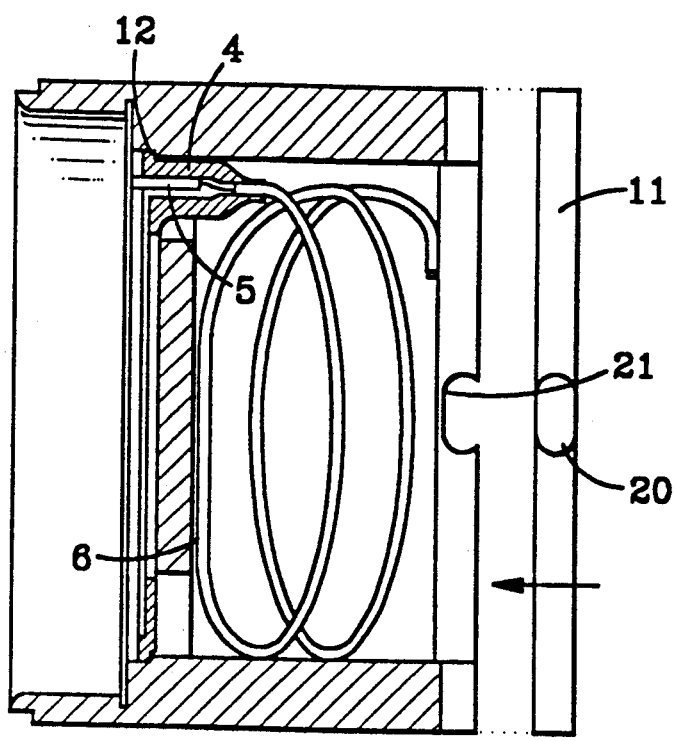
FIG. 5 is an axial cross-sectional view of a protective casing having a removable bottom wall, illustrating an alternative embodiment of rolling-contact bearing assembly of the present invention.

According to an alternative embodiment of the invention illustrated in FIG. 5, bottom wall 11 of casing 8 supports assembly means 20 which works in cooperation with sockets 21 or other interlocking means supported by end 14 of the casing. This embodiment allows the removal of bottom wall 11 for manipulating feed cable 6 or for extracting it from chamber 9. According to the embodiment represented in FIGS. 1 and 2, bottom wall 11 is fixed but has an opening 22 for manipulating or extracting feed cable 6.

Figure 6:
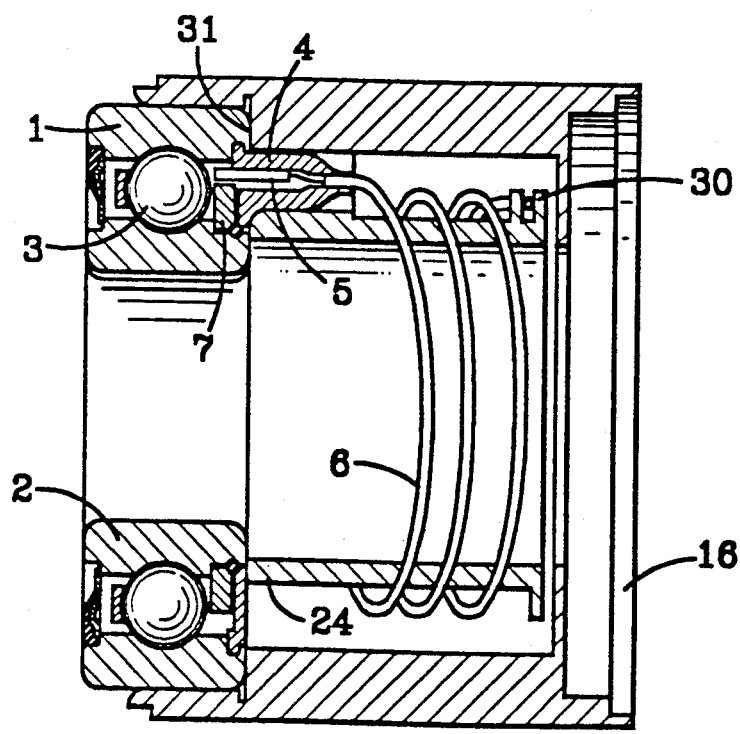
FIG. 6 is an axial cross-sectional view illustrating an alternative embodiment of rolling-contact bearing assembly of the present invention whose protective casing has an axially extending interior wall.

According to a further embodiment of the invention illustrated in FIG. 6, casing 8 supports, on the inside, at least one axial extension 24 for supporting feed cable 6. This extension is in the form of a winding cylinder 24 whose extremities have means for immobilizing feed cable 6 such as, for example, a collet chuck 30 for receiving the end of feed cable 6. Collet chuck 30 also permits the immobilization of a connector which is not shown and which can be connected to feed cable 6.

During the assembly of packing 4 to fixed ring 1 of the rolling-contact bearing, fixed ring 1 is embedded in casing 8 and abuts a shoulder 31 located in the plane between recess 10 and chamber 9. The immobilization with respect to rotational motion and the attachment of fixed ring 1 in casing 8 can be ensured by elastic attachment grooves, not shown, supported by the surface of recess 10 in contact with fixed ring 1 which supports corresponding axial interior grooves, not shown.

To ensure the mounting of packing 4 in the rolling-contact bearing assembly, the bottom of the casing may have a passageway for an axial thrust tool to locate packing 4 in a reception groove, not shown, located on fixed ring 1 without warping of packing 4. Moreover, winding cylinder 24 consists of a cylindrical wall which allows access to rotating ring 2 for a tool for the assembly of the rolling-contact bearing on a shaft or a spindle.

The present invention provides a rolling-contact bearing assembly which includes a protective casing for the cable and its connection with a sensor means allowing the assembly of a number of casings which support, respectively, a packing prior to the mounting of the casings on the rings of the corresponding rolling-contact bearings. The invention also provides a casing for a rolling-contact bearing equipped with its packing which supports the data sensor and the feed cable.

The casing of the present invention facilitates mounting of the packing, which bears the sensor means, on a fixed ring of the rolling-contact bearing by means of a tool. The casing gives free access to the rotating ring of the rolling-contact bearing for the purpose of assembling it to a shaft or a spindle. According to the invention, the casing has a chamber, which extends axially between the fixed ring of the rolling-contact bearing and the bottom wall of the casing, for holding the feed cable.

Having described the invention, what is claimed is:

1. A rolling-contact bearing assembly including a data sensor, the rolling-contact bearing assembly comprising:
   a fixed ring;
   a rotating ring;
   rolling elements in contact with said rings;
   a packing mounted on the fixed ring;
   sensor means supported by said packing;
   encoding means mounted on the rotating ring; and
   a protective casing for the sensor means and its connection with a feed cable, the casing having a chamber for holding the cable extending axially between a recess for receiving the fixed ring and a bottom wall of the casing.

2. The rolling-contact bearing assembly according to claim 1, wherein the bottom wall of the casing supports assembly means which works in cooperation with interlocking means supported by the axial end of the casing opposite the fixed ring.

3. The rolling-contact bearing assembly according to claim 1, wherein the chamber of the casing has an axial abutment shoulder for abutting the packing.

4. The rolling-contact bearing assembly according to claim 1, wherein the two axial ends of the casing have assembly zones.

5. The rolling-contact bearing assembly according to claim 4, wherein the assembly zones consist of an exterior cylindrical bearing surface for embedding and a counterbore, respectively limited by the axial ends of the casing, for allowing a number of casings, each supporting a packing, to be assembled together before being mounted on the fixed ring.

6. The rolling-contact bearing assembly according to claim 4, wherein the assembly zones allow the assembly of a number of casings, each supporting a rolling-contact bearing with a data sensor.

7. The rolling-contact bearing assembly according to claim 1, wherein the casing supports, on the inside, at least one axial extension for the support of the cable.

8. The rolling-contact bearing assembly according to claim 7, wherein the axial extension is constructed in the form of a winding cylinder with an immobilization means for immobilizing the cable.

9. The rolling-contact bearing assembly according to claim 8, wherein the winding cylinder consists of a cylindrical wall which allows access to the rotating ring for a tool for the mounting of the rolling-contact bearing assembly on a shaft or spindle.

10. The rolling-contact bearing assembly according to claim 1, wherein the axial end of the casing opposite the fixed ring has a passageway for an axial thrust tool for mounting of the packing on the fixed ring following the embedding and the abutment of the fixed ring in the casing.

11. The rolling-contact bearing assembly according to claim 1, wherein the casing has a bearing surface for receiving an expansible retainer segment of the packing, limited axially by an abutment shoulder, for compressing the retainer segment in a holding position before it is mounted on the fixed ring.

* * * * *